(12) United States Patent
Komatsu et al.

(10) Patent No.: US 9,050,500 B2
(45) Date of Patent: *Jun. 9, 2015

(54) GOLF BALL

(75) Inventors: Atsushi Komatsu, Chichibu (JP); Yuichiro Ozawa, Chichibu (JP); Hiroshi Nasu, Tokyo (JP)

(73) Assignee: BRIDGESTONE SPORTS CO., LTD., Tokyo (JP)

( * ) Notice: Subject to any disclaimer, the term of this patent is extended or adjusted under 35 U.S.C. 154(b) by 366 days.

This patent is subject to a terminal disclaimer.

(21) Appl. No.: 13/410,012

(22) Filed: Mar. 1, 2012

(65) Prior Publication Data

US 2013/0157784 A1 Jun. 20, 2013

Related U.S. Application Data

(63) Continuation-in-part of application No. 13/328,506, filed on Dec. 16, 2011.

(51) Int. Cl.
*A63B 37/00* (2006.01)
*A63B 37/06* (2006.01)
*A63B 37/08* (2006.01)
*A63B 37/12* (2006.01)
*A63B 37/14* (2006.01)
*C09D 5/00* (2006.01)

(52) U.S. Cl.
CPC ......... *A63B 37/0022* (2013.01); *A63B 37/0029* (2013.01); *A63B 37/0004* (2013.01); *A63B 37/0074* (2013.01); *A63B 37/0075* (2013.01); *A63B 37/0092* (2013.01); *A63B 37/0031* (2013.01); *A63B 37/0064* (2013.01); *A63B 37/0003* (2013.01); *A63B 37/0023* (2013.01); *A63B 37/0033* (2013.01); *C09D 5/00* (2013.01)

(58) Field of Classification Search
USPC .......................................... 473/351, 365, 378
See application file for complete search history.

(56) References Cited

U.S. PATENT DOCUMENTS 3,972,528 A * 8/1976 McCracken et al. .......... 473/566
5,695,414 A * 12/1997 Yokota .......................... 473/384
5,733,974 A * 3/1998 Yamada et al. ................. 525/72
(Continued)

FOREIGN PATENT DOCUMENTS

| JP | 07-280255 | * | 8/1995 |
| JP | 08-206255 | A | 8/1996 |
| JP | 09-276446 | A | 10/1997 |

OTHER PUBLICATIONS

Office Action dated Mar. 10, 2014, issued by the United States Patent and Trademark Office in U.S. Appl. No. 13/328,506.
(Continued)

*Primary Examiner* — Gene Kim
*Assistant Examiner* — John E Simms, Jr.
(74) *Attorney, Agent, or Firm* — Sughrue Mion, PLLC

(57) ABSTRACT

A golf ball of the present invention includes: a core located in the center of the golf ball; a cover surrounding the outside of the core and having plural dimples on the surface thereof; a paint layer surrounding the outside of the cover; and a top coat further surrounding the outside of the paint layer. The paint layer is formed of a material having rubber elasticity. The top coat may have a thickness of at most approximately 60 μm. A material for forming the paint layer has a first loss tangent, a material for forming the cover has a second loss tangent, and a difference Td between the first loss tangent and the second loss tangent may be at least approximately 0.05.

7 Claims, 1 Drawing Sheet

(56) References Cited

U.S. PATENT DOCUMENTS

| | | | |
|---|---|---|---|
| 5,816,943 A * | 10/1998 | Masutani et al. | 473/365 |
| 5,902,190 A * | 5/1999 | Masutani et al. | 473/365 |
| 5,902,191 A * | 5/1999 | Masutani et al. | 473/365 |
| 5,957,785 A * | 9/1999 | Masutani et al. | 473/377 |
| 6,454,667 B1 * | 9/2002 | Iwami | 473/378 |
| 6,488,596 B1 * | 12/2002 | Maruoka et al. | 473/378 |
| 6,967,229 B2 | 11/2005 | Voorheis | |
| 7,297,750 B2 * | 11/2007 | Ishino | 525/458 |
| 2002/0058552 A1 | 5/2002 | Kato | |
| 2002/0095012 A1 * | 7/2002 | Rockrath et al. | 525/123 |
| 2002/0177492 A1 | 11/2002 | Watanabe et al. | |
| 2002/0187858 A1 | 12/2002 | Morgan et al. | |
| 2003/0036443 A1 | 2/2003 | Halko et al. | |
| 2003/0069085 A1 | 4/2003 | Hogge et al. | |
| 2003/0176242 A1 * | 9/2003 | Mano | 473/378 |
| 2005/0054806 A1 | 3/2005 | Kuntimaddi et al. | |
| 2006/0079645 A1 * | 4/2006 | Hasegawa et al. | 525/191 |
| 2006/0172823 A1 | 8/2006 | Loper et al. | |
| 2007/0015603 A1 | 1/2007 | Watanabe et al. | |
| 2008/0015055 A1 * | 1/2008 | Lutz et al. | 473/378 |
| 2011/0053708 A1 * | 3/2011 | Isoagawa et al. | 473/376 |
| 2011/0244989 A1 | 10/2011 | Tarao et al. | |

OTHER PUBLICATIONS

Office Action dated Jun. 25, 2014, and issued by the U.S. Patent and Trademark Office in corresponding U.S. Appl. No. 13/328,506.
Office Action dated Jul. 22, 2014, and issued by the U.S. Patent and Trademark Office in corresponding U.S. Appl. No. 13/759,588.
Office Action dated Dec. 4, 2014, and issued by the U.S. Patent and Trademark Office in corresponding U.S. Appl. No. 13/759,588.
Advisory Action dated Oct. 14, 2014, and issued by the U.S. Patent and Trademark Office in corresponding U.S. Appl. No. 13/328,506.
Notice of Allowance dated Aug. 5, 2014, and issued by the U.S. Patent and Trademark Office in corresponding U.S. Appl. No. 13/409,994.

* cited by examiner

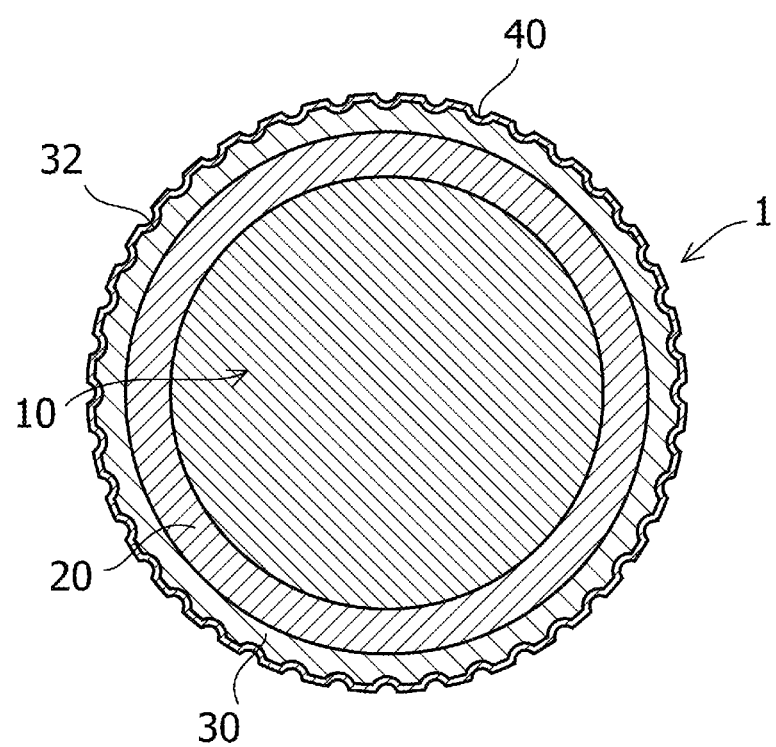

GOLF BALL

CROSS-REFERENCE TO RELATED APPLICATIONS

This application claims the benefit of U.S. patent Ser. No. 13/328,506 filed Dec. 16, 2011.

BACKGROUND OF THE INVENTION

The present invention relates to a golf ball, and more particularly, relates to a golf ball having an improved painted layer.

The surface of a golf ball is usually covered with a painted layer. This painted layer is demanded to have characteristics in appearance such as color tone, impact resistance, and abrasion resistance. Japanese Patent Application Publication No. 8-206255 discloses a golf ball including a paint layer formed of a coating composition containing acrylic polyol, polyester polyol and a hardening agent in order to improve its impact resistance and abrasion resistance.

Generally, a high-performance golf ball has a low spin rate when it is hit with a driver, thereby increasing distance. When the ball is hit for approach, its spin rate is increased to secure an excellent controllability around the green. To improve the above-described performance, Japanese Patent Application Publication No. 9-276446 discloses an idea that by using two paint layers, an inside layer is formed as a white coating film of thermoplastic resin by dispersion coating, and the outside layer is formed of transparent coating film of thermoplastic resin by dispersion coating.

SUMMARY OF THE INVENTION

Due to development of simulation technology, mechanisms of generation of spin in golf balls have been investigated. Consequently, it has been revealed that the greater the friction between the golf club and the golf ball in both hitting with a driver and hitting for approach, the better the spin performance of the golf ball becomes.

Although Japanese Patent Application Publication No. 8-206255 has stated that increasing the friction force of the surface of the golf ball improves the impact resistance and the abrasion resistance of the golf ball, the spin performance of the golf ball cannot be improved sufficiently by the friction force to such an extent as described in this publication.

According to Japanese Patent Application No. 9-276446, the two-layer coating film is formed into a thick paint layer of 700 μm or less, and dimples are formed not in the cover but in the paint layer. Thus, a too thick paint layer complicates the manufacturing process, thereby affecting manufacturing efficiency.

Accordingly, the present invention aims at providing a golf ball of which the paint layer is improved to increase a friction force with respect to a golf club, thereby improving spin performance, the golf ball further having an excellent abrasion resistance.

To achieve the above-described object, a golf ball of the present invention includes: a core located in the center of the golf ball; a cover which surrounds the outside of the core and has plural dimples on the surface thereof; a paint layer which surrounds the outside of the cover, the paint layer being formed of a material having rubber elasticity; and a top coat which further surrounds the outside of the paint layer.

By forming the paint layer of a material having the rubber elasticity, the thin paint layer on the surface of the golf ball can be softened, and consequently, the friction force with respect to a golf club can be increased so as to improve the spin performance. Further, by forming the top coat with a material having an excellent anti-abrasion performance, the golf ball having both an excellent spinning performance and an excellent anti-abrasion performance can be provided. According to simulations by the inventors, it has been found that by increasing the coefficient of friction on the surface of a ball, when the ball is struck with a driver, the spin rate is decreased or not increased, but when the ball is struck for approach, the spin rate is increased. Additionally, it has been also found that even if the top coat is applied onto the paint layer having the rubber elasticity, the anti-abrasion performance can be improved while a sufficient surface frictional force is maintained.

The paint layer may have a thickness of approximately 100 μm or less. The paint layer may have a hardness of approximately 70 or less in terms of JIS-C hardness. JIS stands for Japanese Industrial Standard. A material for forming the paint layer may a Young's modulus of approximately 70 MPa or less. A material for forming the paint layer may have a Poisson's ratio of approximately 0.45 or more. A ratio Sp of the JIS-C hardness of the paint layer with respect to the μ hardness of the golf ball may be approximately 15 or less.

The top coat may have a thickness of approximately 60 μm or less. With a material for forming the paint layer having a first loss tangent, a material for forming the cover having a second loss tangent, a difference Td between the first loss tangent and the second loss tangent may be approximately 0.05 or more. By setting both the loss tangents of the coating layer and the cover layer at a preferable value each, a more excellent spinning performance can be achieved.

The cover may contain ionomer resin. The cover may have a hardness of 40 or more in terms of Shore D hardness. A ratio Sc of the Shore D hardness of the cover with respect to the μ hardness of the golf ball may be approximately 25 or less. A material for forming the paint layer may have a first loss tangent, a material for forming the cover may have a second loss tangent, and a difference Td between the first loss tangent and the second loss tangent may be approximately 0.05 or more.

The golf ball may include a top coat for further surrounding the outside of the paint layer. The top coat may have a thickness of approximately 60 μm or less.

BRIEF DESCRIPTION OF THE DRAWINGS

FIG. 1 is a sectional plan view showing a golf ball according to an embodiment of the present invention.

DESCRIPTION OF THE PREFERRED EMBODIMENTS

Hereinafter, an embodiment of a golf ball according to the present invention will be described with reference to the accompanying drawings, but the present invention is not restricted to the present embodiment. In the meantime, the accompanying drawings are drawn mainly to make the present invention easier to understand, but they are not drawn to scale.

As shown in FIG. 1, the golf ball 1 of the present embodiment mainly includes a core 1 located in the center of the ball, a cover 30 surrounding the outside of the core and a paint layer 40 surrounding the outside of the cover. Plural dimples are formed on the surface of the cover 30. The paint layer 40 covers the surface of the cover 30 along dents of the dimples 32 with a substantially equal thickness.

Although the golf ball 1 can include an intermediate layer 20 between the core 10 and the cover 30 freely as shown in FIG. 1, the present invention is not restricted to the present example, and it is permissible to form the ball so that the cover 30 is in direct contact with the core 10 without any provision of the intermediate layer 20.

The core 10 can be formed mainly of base rubber. As the base rubber, a variety of rubbers (thermoplastic elastomer) may be used, such as polybutadiene rubber (BR), styrene-butadiene rubber (SBR), natural rubber (NR), polyisoprene rubber (IR), polyurethane rubber (PU), butyl rubber (IIR), vinyl polybutadiene rubber (VBR), ethylene-propylene rubber (EPDM), nitrile rubber (NBR), and silicone rubber; however, the present invention is not restricted to these materials. As the polybutadiene rubber (BR), for example, 1,2-polybutadiene, cis-1,4-polybutadiene and the like may be used.

As well as the base rubber for the main component, for example, co-cross linking agent, cross linking agent, filler, age resistor, isomerization agent, peptizing agent, sulfur and organic sulfur compound may be added to the core 10. As the main component, thermoplastic elastomer, ionomer resin or a mixture of these components may be used instead of the base rubber.

As the co-cross linking agent, it is preferable to use, for example, $\alpha,\beta$-unsaturated carboxylic acid or its metallic salt, although it is not restricted to these materials. As the $\alpha,\beta$-unsaturated carboxylic acid or its metallic salt, for example, acrylic acid, methacrylic acid, and zinc salt, magnesium salt and calcium salt of these substances are available. Although the composition of the co-cross-linking agent is not restricted to this example, for example, assuming that the base rubber is 100 parts by weight, it is preferred to be approximately 5 parts or more by weight and more preferred to be approximately 10 parts or more by weight. Furthermore, the composition of the co-cross-linking agent is preferred to be approximately 70 parts or less by weight and more preferred to be approximately 50 parts or less by weight.

As the cross-linking agent, it is preferred to use organic peroxide, although it is not restricted to this substance. Assuming that the base rubber is 100 parts by weight, the composition of an initiator is preferred to be approximately 0.10 parts by weight, more preferred to be approximately 0.15 parts by weight, and further preferred to be approximately 0.30 parts by weight, although it is not restricted to these values. The composition of the initiator is preferred to be approximately 8 parts or less by weight and is more preferred to be approximately 6 parts or less by weight.

Although, as the filler, for example, silver, gold, cobalt, chrome, copper, germanium, manganese, molybdenum, nickel, lead, platinum, tin, titanium, tungsten, zinc, zirconium, barium sulfate, zinc oxide, and manganese oxide may be used, it is not restricted to these substances. The filler is preferred to be in the form of a powder. Assuming that the base rubber is 100 parts by weight, the composition of the filler is preferred to be approximately 1 part or more by weight, more preferred to be approximately 2 parts or more by weight and further preferred to be approximately 3 parts or more by weight. Furthermore, the composition of the filler is preferred to be approximately 100 parts or less by weight, is more preferred to be approximately 80 parts or less by weight, and is further preferred to be approximately 70 parts or less by weight.

The core 10 is substantially spherical. The outside diameter of the core 10 is preferred to be approximately 42 mm or less, is more preferred to be approximately 41 mm or less, and is further preferred to be approximately 40 mm or less. Because if the outside diameter of the core is too small, the restitutive performance of the golf ball is decreased, it is preferred to be approximately 5 mm or more, more preferred to be approximately 15 mm or more, and further preferred to be approximately 25 mm or more. Although the core shown in FIG. 1 is solid, the core is not restricted to this example, but may be hollow. Although the core 10 shown in FIG. 1 is of a single layer, the core is not restricted to this example, but may be constituted of plural layers, for example, a center core and surrounding layers.

As the forming method of the core 10, any known forming method for the core for a golf ball may be adopted. For example, the core may be obtained by kneading materials including the base rubber with a kneading machine and vulcanizing the kneaded materials under pressure with a spherical mold. As a method for forming a core having plural layers, it is permissible to adopt a known forming method for the multi-layered solid-core. For example, materials are kneaded with a kneading machine and then, the center core is obtained by vulcanizing the kneaded materials under a pressure with a spherical mold. After that, for the surrounding layers, again, materials are kneaded with the kneading machine and the kneaded materials are formed into a sheet. Then, the center core is covered with this sheet and vulcanized under pressure with the spherical mold to obtain a multi-layered core.

The cover 30 may be formed using ionomer, polyurethane thermoplastic elastomer, thermoplastic polyurethane or a mixture of these substances, although the material thereof is not restricted thereto. Furthermore, as well as the aforementioned ionomer resin, polyurethane thermoplastic elastomer, and thermoplastic polyurethane, which serve as the main component, other thermoplastic elastomer, polyisocyanate compound, fatty acid or its derivative, basic inorganic metal compound or filler may be added to the core 30.

As the ionomer resin, the following resins containing at least one of a component (a) and a component (b) may be used as the base resin, although it is not restricted to these substances. Furthermore, the following component (c) may be freely added to this base resin. The component (a) is at least one of an olefin-unsaturated carboxylic acid-unsaturated carboxylic ester random terpolymer and a metallic salt thereof. The component (b) is at least one of an olefin-unsaturated carboxylic acid random copolymer and a metallic salt thereof. The component (c) is thermoplastic block copolymer having polyolefin crystalline block and at least one of a polyethylene and a butylene random copolymer.

The thickness of the cover 30 is preferred to be approximately 0.2 mm or more, and more preferred to be approximately 0.4 mm or more, although it is not restricted to these values. Furthermore, the thickness of the cover 30 is preferred to be approximately 4 mm or less, is more preferred to be approximately 3 mm or less, and is further preferred to be approximately 2 mm or less. Plural dimples 32 are formed on the surface of the cover 30. The size, shape, and quantity of the dimples 30 may be designed appropriately corresponding to a desired aerodynamic characteristic of the golf ball 1.

The hardness of the cover 30 is preferred to be approximately 40 or more in terms of Shore hardness, is more preferred to be approximately 50 or more, and is further preferred to be approximately 55 or more. Additionally, the hardness of the cover 30 is preferred to be approximately 75 or less, more preferred to be approximately 70 or less, and further preferred to be approximately 65 or less.

To form the cover 30, known forming methods of the cover of the golf ball may be adopted. For example, the cover 30 is formed by injection-molding a material for the cover into a mold, although the forming method is not restricted to any particular one. The mold for forming the cover has cavities for molding the cover, and this cavity has plural projections for forming the dimples on the wall surface thereof. By disposing the core 10 in the center of the cavity, the cover 30 is formed such that it surrounds the core 10.

The paint layer 40 is formed of material having rubber elasticity. The Young's modulus of the material having rubber elasticity is preferred to be approximately 0.1 MPa or more, more preferred to be approximately 1 MPa or more, and further preferred to be approximately 3 MPa or more, although the material for use is not restricted to these materials. Furthermore, the Young's modulus of the material is preferred to be approximately 70 MPa or less, is more preferred to be approximately 65 MPa or less, and is further preferred to be approximately 60 MPa or less. The Poisson's ratio of the material having rubber elasticity is preferred to be approximately 0.45 or more, is more preferred to be approximately 0.46 or more, and is further preferred to be approximately 0.47 or more, although the material for use is not restricted to these materials. Furthermore, the Poisson's ratio of the material is preferred to be approximately 0.60 or less, is more preferred to be approximately 0.55 or less, and is further preferred to be approximately 0.50 or less. Unless the Young's modulus or the Poisson's ratio is within the above-mentioned range, a paint layer 40 may not ensure sufficient plasticity or friction force.

Regarding a material having such rubber elasticity, according to, for example, a classification of JIS K 6397, as an M-group (rubbers having polymethylene type saturated main chain), ACM (acrylic rubber or rubber-like copolymer formed of ethyl acrylate or other acrylic ester with a small amount of monomer allowing vulcanization), AEM (rubber-like copolymer formed of ethyl acrylate or acrylic ester with ethylene), ANM (rubber-like copolymer formed of ethyl acrylate or acrylic ester with acrylonitrile), CM (polyethylene chloride), CSM (chlorosulfonated polyethylene, trade name: Hypalon), EPDM (rubber-like copolymer formed of ethylene, propylene and diene. Called EPT also), EPM (rubber-like copolymer formed of ethylene and propylene. Called EPR also), and EVM (rubber-like copolymer formed of ethylene and vinyl acetate) polymers may be used.

As an O group (rubber having carbon and oxygen in the main chain), polymers such as CO (called epichlorohydrin rubber or polychloromethyl oxirane also) and ECO (rubber-like copolymer formed of ethylene oxide and epichlorohydrin) may be used.

As an R group (rubber having unsaturated carbon bond in the main chain), BR (butadiene rubber), CR (chloroprene rubber. Trade name: neoprene), IIR (butyl rubber or rubber-like copolymer formed of isobutene and isoprene), IR (synthetic natural rubber or isoprene rubber), NBR (nitrile rubber or rubber-like copolymer formed of acrylonitril and butadiene), NR (natural rubber), NOR (polynorbornene rubber), SBR (rubber-like copolymer formed of styrene and butadiene), E-SBR (rubber-like copolymer formed of styrene and butadiene by emulsion polymerization), S-SBR (rubber-like copolymer formed of styrene and butadiene by solution polymerization), SIBR (rubber-like copolymer formed of styrene, isoprene and butadiene), XBR (carboxylated butadiene rubber), XCR (carboxylated chloroprene rubber), XNBR (carboxylated rubber-like copolymer formed of acrylonitril and butadiene), XSBR (carboxylated rubber-like copolymer formed of styrene and butadiene), BIIR (brominated butyl rubber or rubber-like copolymer formed of brominated isobutene and isoprene), CIIR (chlorinated butyl rubber or rubber-like copolymer formed of chlorinated isobutene and isoprene) may be used.

The thickness of the paint layer 40 is preferred to be approximately 5 μm or more and is more preferred to be approximately 10 μm or more, although it is not always restricted to these values. Furthermore, the thickness of the paint layer 40 is preferred to be approximately 100 μm or less and more preferred to be approximately 60 μm or less. If the coating is too thin, not only cannot sufficient friction be secured, but also the coating may become easy to peel, thereby leading to inferior performance in terms of function and durability. Furthermore, conversely, if the coating is too thick, the driver spin is increased so that sufficient distance may not be secured.

As a material applied to the paint layer 40, a material having a large loss tangent (tan δ), i.e., a material having a low coefficient of restitution, is preferable. As a result, the deformation amount of the material is increased, and consequently, the friction force can be increased. The loss tangent tan δ is preferred to be approximately 0.05 or more, is more preferred to be approximately 0.10 or more, is further preferred to be approximately 0.15 or more, and is most preferred to be approximately 0.20 or more. Furthermore, the upper limit of the loss tangent tan δ is preferred to be approximately 0.30, or less and is more preferred to be approximately 0.28 or less, although it is not restricted to any particular value. In particular, to reduce the driver spin and intensify the approach spin, preferably, the loss tangent tan δ of the cover 30 is set to a small value while the value tan δ of the paint layer 40 is set to a large value. Thus, as the material of the paint layer 40, it is preferable to use a material having a larger tan δ than the material of the cover 30. Td=tan δ−tan δ of the cover of the paint layer is preferred to be approximately 0.05 or more, is more preferred to be approximately 0.07 or more, and is further preferred to be approximately 0.10 or more.

In addition, the loss tangent (tan δ) is expressed as a value obtained by dividing loss elastic modulus by storage elastic modulus, and is also called the dynamic viscoelastic modulus. This loss tangent (tan δ) can be measured with a commercially available measuring device, for example, a dynamic viscoelastic modulus measuring device (DMA Q800) manufactured by TA Instrument. As a measuring condition, a specimen is prepared in dimensions of 3 mm in width, 1 mm in thickness and 20 mm in length (this length is that of a portion actually measured and does not include both-end portions nipped). Assume that its initial distortion is 0.1 N, the amplitude is 1% and the frequency is 15 Hz. The measurement is performed in a temperature range of −100° C. to 80° C. with a rate of temperature rise of 3° C./minute and then, a measured value at −10° C. is adopted.

The hardness of the paint layer 40 is preferred to be approximately 10 or more in terms of JIS-C hardness, more preferred to be approximately 20 or more, and further preferred to be approximately 30 or more, although it is not restricted to these values. Furthermore, the hardness of the paint layer 40 is preferred to be approximately 70 or less, is more preferred to be approximately 60 or less, and is further preferred to be approximately 50 or less. In particular, the hardness of the paint layer 40 is preferred to be lower than that of the core 10. By forming a golf ball so that the hardness thereof is increased gradually from the core center toward the surface, the driver spin can be reduced to increase the distance. As a consequence, by disposing the softest material thinly in the vicinity of the surface of the golf ball, often an appropriate spin can be obtained in approach.

The harder the cover 30 serving as a foundation of the paint layer 40, the more easily the approach spin is applied. When the hardness of a golf ball product 1 is increased, in case of the hard cover 30, the amount of deformation which occurs when the ball is hit is reduced so that its contact area becomes short. As a consequence, slip phenomenon occurs to decrease in the approach spin. Thus, if the hardness of the golf ball product 1 is high, it is preferable to intensify the hardness of the cover 30 as much as possible within a range which does not cause the slip. For example, as for a relationship between the μ hardness of the golf ball product 1 and the Shore D hardness of the cover 30, Shore D hardness of the cover/μ hardness of the golf ball product=Sc is preferred to be approximately 25 or less and more preferred to be approximately 23 or less. Although the lower limit of this hardness ratio Sc is not restricted to any particular value, it is preferred to be approximately 5 or more, is more preferred to be approximately 10 or more and is further preferred to be approximately 14 or more. In the meantime, the μ hardness refers to the amount of flexure (deformation) when a load is applied to the golf ball product 1 from its initial load of 98 N (10 kgf) up to 1,275 N (130 kgf) and is expressed in the unit of mm.

Due to the same reason as the relationship between the hardness of the golf ball product 1 and the hardness of the cover 30, when the hardness of the golf ball product 1 is increased, the amount of deformation when it is hit is decreased, so that the contact area becomes short, thereby causing the slip phenomenon to reduce the spin for approach. Thus, if the hardness of the golf ball product 1 is high, it is preferable to increase the friction force of the paint layer 40 in order to prevent occurrence of the slip, that is, to lower the hardness. For example, as for the relationship between the μ hardness of the golf ball product 1 and the JIS-C hardness of the paint layer 40, Sp=JIS-C hardness of the paint layer/μ hardness of the golf ball product is preferred to be approximately 15 or less, and is more preferred to be approximately 13 or less. Although the lower limit of this hardness ratio Sp is not restricted to any particular value, it is preferred to be approximately 2 or more, is more preferred to be approximately 5 or more, and is further preferred to be approximately 7 or more.

As a formation method of the paint layer 40, any known formation method of the paint layer of the golf ball may be adopted. For example, for the paint layer 40, a liquid coating material can be obtained by diluting material having the above-described rubber elasticity with solvent, although it is not restricted to any particular material. As the solvent, n-pentane, gasoline, n-hexane, diethyl ether, cyclohexane, isobutyl acetate, butyl acetate, isopropyl acetate, methyl isopropyl ketone, xylene tetrachloride, methyl propyl ketone, ethyl benzene, xylene, toluene, ethyl acetate, tetrahydrofurany, benzene, chloroform, methyl ethyl ketone, trichloroethylene, acetone, n-hexanol and the like are available, although it is not restricted to any particular type. The dilution rate (concentration of coating polymer) may be approximately 5% to approximately 100%, although it is not restricted to any particular value.

After coating the surface of the cover 30 with this coating material, the paint layer 40 can be formed by a cross-linking process. The coating method is not restricted to any particular one, but any coating material may be applied by a spraying method, dipping method, rolling method or spinning method. Although the cross-linking method is not restricted to any particular type, it is preferable to add a cross-linking agent or a hardening agent to the above-mentioned coating material, so that, after the coating material is applied, cross-linking or hardening is induced. As the cross-linking agent or the hardening agent, cross-linking with, for example, peroxide, metal, amine, oxime, resin, or sulfur is preferable to obtain the paint layer 40 having a sufficient impact resilience. Furthermore, as well as the cross-linking agent and the hardening agent, a filler may be added freely to the coating material. Even a material difficult to cross-link can be applied by dispersing the material having a long molecular chain in solvent, and even if no cross-linking agent is used, the molecular chains tangle with each other to produce a coating material having rubber elasticity.

A top coat (not shown) for covering the paint layer 40 can be freely formed on the paint layer 40. As the top coat material, any known material suitable for the top coat of the golf ball may be used. As the material, polyester polyol or acrylic polyol may be used and fixed with hardening agent. For example, two-liquid type curable urethane coating material can be mentioned, and in particular, it is preferable to use non-yellowing type coating material. The thickness of the top coat is preferred to be, for example, approximately 5 μm or more and more preferred to be approximately 10 μm or more. Furthermore, the thickness of the top coat is preferred to be approximately 100 μm or less and is more preferred to be approximately 60 μm or less.

The intermediate layer 20 disposed between the core 10 and the cover 30 is not indispensable but may be provided freely. It is permissible to provide an intermediate layer which functions as a core or a cover. Furthermore, it is also permissible to provide plural intermediate layers, for example, plural intermediate layers which function as the core or the cover, or a first intermediate layer which functions as the core and a second intermediate layer which functions as the cover.

For materials of the intermediate layer 20, the following heated mixture is preferably used as the main material, but the materials are not limited thereto. Using the following mixture for the intermediate layer can lower the spin rate of the hit ball, and thus, long distance can be achieved.

(a) at least one of olefin-unsaturated carboxylic acid random copolymer and a metal ion neutralizing material of olefin-unsaturated carboxylic acid random copolymer, (b) at least one of olefin-unsaturated carboxylic acid-unsaturated carboxylic acid ester random terpolymer and a metal ion neutralizing material of olefin-unsaturated carboxylic acid-unsaturated carboxylic acid ester random terpolymer, (c) at least one of fatty acid having a molecular weight of 228 to 1500 and its derivative, (d) basic inorganic metallic compound capable of neutralizing an unneutralized acid group in components (a) to (c), and (e) non-ionomer thermoplastic elastomer, wherein a base resin contains component (a) and component (b) which are mixed in a ratio of 100:0 to 0:100 by weight, wherein the base resin and component (e) are mixed in a ratio of 100:0 to 50:50 by weight, and wherein 5 to 150 parts by weight of component (c) and 0.1 to 17 parts by weight of component (d) are added to the resin component containing the base resin and component (e) with respect to 100 parts by weight of the resin component.

The "main material" mentioned here means a material which has approximately 50 weight % or more with respect to the total weight of the intermediate layer 20, preferably approximately 60 weight % or more and more preferably approximately 70 weight % or more.

The thickness of the intermediate layer 20 is preferred to be approximately 0.5 mm or more and is more preferred to be approximately 1 mm, although it is not restricted to these values. Furthermore, the thickness of the intermediate layer 20 is preferred to be approximately 10 mm or less, is more preferred to be approximately 5 mm or less, and is further preferred to be approximately 3 mm or less. In the meantime, although the intermediate layer 20 is expressed in a single layer in FIG. 1, it is limited to this example but may be formed of two or more layers.

Example

Golf balls having a configuration shown in Table 1 were manufactured and then, tests for measuring the spin performance of the golf balls were performed. In each example, five balls were prepared and evaluated. Table 1 shows a test result indicating each average of the five balls. Table 2 shows mixtures A to C of the materials shown in Table 1 of the core (in parts by weight). Table 3 shows mixtures E to G of the materials of the cover (in parts by weight). Table 4 shows mixtures H to K of the materials of the paint layer and the top coat (in parts by weight). In the meantime, the paint layer is formed by diluting a material having a predetermined mixture with toluene 30% to 50% and then spraying the material.

TABLE 1

|  |  | Examples | | | | | | | |
|---|---|---|---|---|---|---|---|---|---|
|  |  | 1 | 2 | 3 | 4 | 5 | 6 | 7 | 8 |
| Core | Outer diameter (mm) | 39.3 | 39.3 | 39.3 | 39.3 | 39.3 | 39.3 | 39.3 | 39.3 |
|  | Mixture | A | B | B | B | B | B | B | C |
| Cover | Thickness (mm) | 1.7 | 1.7 | 1.7 | 1.7 | 1.7 | 1.7 | 1.7 | 1.7 |
|  | Shore D hardness | 63 | 63 | 63 | 63 | 63 | 63 | 63 | 60 |
|  | Mixture | E | E | E | E | E | E | E | F |
|  | tan δ | 0.12 | 0.12 | 0.12 | 0.12 | 0.12 | 0.12 | 0.12 | 0.1 |
| Paint | Thickness (μm) | 20 | 20 | 20 | 20 | 40 | 60 | 100 | 20 |
| Layer | JIS-C hardness | 40 | 40 | 50 | 60 | 40 | 40 | 40 | 40 |
|  | Mixture | H | H | I | J | H | H | H | H |
|  | tan δ | 0.25 | 0.25 | 0.26 | 0.27 | 0.25 | 0.25 | 0.25 | 0.25 |
| Top coat | Thickness (μm) | — | — | — | — | — | — | — | — |
|  | Mixture | — | — | — | — | — | — | — | — |
| Product μ hardness (mm) |  | 3.0 | 4.0 | 4.0 | 4.0 | 4.0 | 4.0 | 4.0 | 2.7 |
| Hardness ratio Sc |  | 21.0 | 15.8 | 15.8 | 15.8 | 15.8 | 15.8 | 15.8 | 22.2 |
| Hardness ratio Sp |  | 13.3 | 10.0 | 12.5 | 15.0 | 10.0 | 10.0 | 10.0 | 14.8 |
| tan δ difference Td |  | 0.13 | 0.13 | 0.14 | 0.15 | 0.13 | 0.13 | 0.13 | 0.15 |
| Spin performance | Driver | 2550 | 2490 | 2500 | 2510 | 2540 | 2560 | 2580 | 2520 |
| (rpm) | Approach | 5800 | 5700 | 5600 | 5500 | 5650 | 5630 | 5630 | 5720 |
| Anti-abrasion | 23° C. | A | A | A | A | A | A | A | A |
| performance | 13° C. | B | A | A | A | A | A | A | B |
|  | 0° C. | B | B | B | B | B | B | B | B |

|  |  | Examples | | | | | | | |
|---|---|---|---|---|---|---|---|---|---|
|  |  | 9 | 10 | 11 | 12 | 13 | 14 | 15 | 16 |
| Core | Outer diameter (mm) | 39.3 | 39.3 | 39.3 | 39.3 | 39.3 | 39.3 | 39.3 | 39.3 |
|  | Mixture | A | B | C | A | A | B | B | B |
| Cover | Thickness (mm) | 1.7 | 1.7 | 1.7 | 2.5 | 1.7 | 1.7 | 1.7 | 1.7 |
|  | Shore D hardness | 63 | 63 | 60 | 63 | 61 | 63 | 63 | 63 |
|  | Mixture | E | E | F | E | G | E | E | E |
|  | tan δ | 0.12 | 0.12 | 0.10 | 0.12 | 0.21 | 0.12 | 0.12 | 0.12 |
| Paint | Thickness (μm) | 20 | 150 | 20 | 20 | 20 | 60 | — | 20 |
| Layer | JIS-C hardness | 40 | 40 | 60 | 40 | 40 | 40 | — | 72 |
|  | Mixture | H | H | J | H | H | H | — | K |
|  | tan δ | 0.25 | 0.25 | 0.27 | 0.25 | 0.25 | 0.25 | — | 0.20 |
| Top coat | Thickness (μm) | 10 | — | — | — | — | 100 | — | — |
|  | Mixture | K | — | — | — | — | K | — | — |
| Product μ hardness (mm) |  | 3.0 | 4.0 | 2.7 | 3.0 | 3.1 | 4.0 | 4.0 | 4.0 |
| Hardness ratio Sc |  | 21.0 | 16.0 | 22.2 | 21.0 | 19.7 | 15.8 | 15.8 | 16.0 |
| Hardness ratio Sp |  | 13.3 | 10.0 | 22.2 | 13.3 | 12.9 | 10.0 | — | 18.0 |
| tan δ difference Td |  | 0.13 | 0.13 | 0.17 | 0.13 | 0.04 | 0.13 | — | 0.08 |
| Spin performance | Driver | 2580 | 2650 | 2540 | 2530 | 2720 | 2600 | 2480 | 2600 |
| (rpm) | Approach | 5650 | 5550 | 5200 | 4950 | 5800 | 5200 | 3500 | 4800 |
| Anti-abrasion | 23° C. | S | A | A | A | A | S | A | A |
| performance | 13° C. | S | A | B | A | B | S | A | A |
|  | 0° C. | A | B | B | B | B | A | B | B |

TABLE 2

| Composition of core | A | B | C |
|---|---|---|---|
| Polybutadiene | 100 | 100 | 100 |
| Zinc acrylate | 27.5 | 18.5 | 29.8 |
| Peroxide 1 | 0.6 | 0.6 | 0.6 |

TABLE 2-continued

| Composition of core | A | B | C |
|---|---|---|---|
| Peroxide 2 | 0.6 | 0.6 | 0.6 |
| Anti-aging agent | 0.1 | 0.1 | 0.1 |
| Zinc oxide | 21.3 | 25.0 | 20.4 |
| Organic sulfur compound | 0.2 | 0.2 | 0.2 |
| Vulcanization Temperature (° C.) | 155 | 155 | 155 |
| method Time (h) | 15 | 15 | 15 |

As polybutadiene, BR01 manufactured by JSR was used for base rubber. As zinc acrylate, WN86 manufactured by Nippon Shokubai was used. Percumyl D, which is the trade name of dicumylperoxide manufactured by NOF Corporation, was used as peroxide 1. Perhexa C-40, which is the trade name of a mixture of 1,1-di(t-butylperoxy)cyclohexane and silica manufactured by NOF was used as peroxide 2. This product was used as an initiator. Nocrac NS-6, which is the trade name of 2,2'-methylenebis(4-methyl-6-t-butylphenol) manufactured by Ouchi Shinko Chemical Industry, was used as anti-aging agent. Zinc Oxide Grade 3, which is a trade name available from Sakai Chemical Industry, was used as zinc oxide. Pentachlorothiophenol zinc salt was used as the organic sulfur compound.

TABLE 3

| Composition of cover | E | F | G |
|---|---|---|---|
| Himilan 1557 | — | 50 | — |
| Himilan 1605 | 40 | — | — |
| Himilan 1706 | 50 | — | — |
| Himilan 1601 | 10 | 50 | — |
| Pandex T8260 | — | — | 100 |
| polyisocyanate compound | — | — | 7.5 |
| Hytrel 4001 | — | — | 11 |
| Polyethylene wax | — | — | 1 |
| $TiO_2$ | 3 | 3 | 3 |

Himilan 1557 is ionomer resin of Zn-ion neutralizing ethylene-methacrylate copolymer manufactured by Mitsui DuPont Chemical. Himilan 1605 is ionomer resin of Na-ion neutralizing ethylene-methacrylate copolymer manufactured by Mitsui DuPont Chemical. Himilan 1706 is ionomer resin of Zn-ion neutralizing ethylene-methacrylate copolymer manufactured by Mitsui DuPont Chemical. Himilan 1601 is ionomer resin of Na-ion neutralizing ethylene-methacrylate copolymer manufactured by Mitsui DuPont Chemical. Pandex T8260 is MDI-PTMG type thermoplastic polyurethane material manufactured by DIC Bayer Polymer, with Durometer D type resin hardness of 56 and modulus of repulsion elasticity of 45%. Polyisocyanate compound is 4,4'-diphenyl methane di-isocyanate. Hytrel 4001 is thermoplastic polyether ester elastomer manufactured by Toray-DuPont Co., Ltd. $TiO_2$ is Tipaque R550 manufactured by Ishihara Sangyo Ltd.

TABLE 4

| Composition of paint layer | | H | I | J | K |
|---|---|---|---|---|---|
| Main material | Oil Proto | 100 | 100 | 100 | — |
| | Polyester polyol | — | — | — | 50 |
| | Acrylic polyol | — | — | — | 50 |
| Filler | Sediment barium sulfate | — | 20 | 40 | — |
| Hardening agent | | — | — | — | 50 |
| Young's modulus (MPa) | | 12 | 32 | 53 | 71 |
| Poison's ratio | | 0.495 | 0.488 | 0.482 | 0.464 |

The Oil Proto is a product name of Hagitec's product, which is produced of SBR resin as its main component. Its detailed composition includes gasoline (naphtha) of 33 to 37%, hexane of 13 to 16%, xylene of 15 to 19%, acetone of 8 to 10% and SBR resin of 24 to 28%. The polyester polyol is modified with recinolic acid which is a vegetable oil fatty acid having a carbon number of 18, and polyester polyol has a total molecular weight of 1500 and hydroxyl number of 135. The acrylic polyol is ACRYDIC 801 (hydroxyl number of 100) manufactured by Dai Nippon Ink. The sediment barium sulfate is Sediment Barium Sulfate #100 in its product name, manufactured by Sakai Chemical Industry. The hardening agent used here is hexamethylene diisocyanate.

In the tests for measurement of the spinning performance shown in Table 1, with a driver (Tour Stage X-Drive Type 455 9.5° manufactured by Bridgestone) and an approach wedge (Tour Stage X-WEDGE 58° manufactured by Bridgestone) mounted on a swing robot (manufactured by Mieyama), a golf ball was hit at a head speed of 45 m/s for the driver, and at a head speed of 25 m/s for the approach, and the ball just after it was hit was photographed with a high-speed camera to measure its spin rate (rpm).

For tests for measurement of the anti-abrasion performance shown in Table 1, balls were warmed at 23° C., 13° C., 0° C. respectively assuming an actual usage condition and the balls were hit with a swing robot equipped with a non-plated pitching wedge at a head speed of 33 m/s. By recognizing impact marks on the balls with naked eyes, balls which seven raters or more of ten judged to be still usable were rated "S" and balls which four to six raters judged to be still usable were rated "A", and balls which three raters or less judged to be still usable were rated "B".

As for the measurement method of Young's Modulus in Table 4, the materials having each composition were formed into a sheet having a thickness of 2 mm and stored under an temperature environment of 23±1° C. for two weeks. They were processed into a dumbbell-like No. 3 test pieces according to JIS K6251, and using Tensilon Universal Tester RTG-1310 manufactured by A&D, their tensile strengths (MPa) at a time of 10% elongation were measured at a test speed of 500 mm/min. Then, the Young's Moduli were calculated from these measured tensile strengths. In addition, three test pieces were prepared for each composition, and an average value was adopted as a measurement value of this test.

Because Example 15 having no paint layer provides the surface of a golf ball with little friction force as shown in Table 1, the spin rate at the time of the approach was very small, although the driver used here had a predetermined performance in terms of the spin rate. Example 16 having a paint layer formed of hard resin indicated a small friction force on the surface of the golf ball. Thus, although this example indicates an increased spin rate compared to Example 15, Example 16 did not reach a desired performance.

On the other hand, because each of the paint layers in Examples 1 to 14 was formed of the material having rubber elasticity, the spin rate for approach was increased while the spin rate when the ball was hit with a driver was not increased. As shown in Example 10, when the paint layer was too thick, the friction force was large, so that the spin rate for approach could be greatly increased. However, an influence of the softness of the paint layer emerges when the ball is hit with a driver, thereby sometimes leading to an increase in the spin rate at the time.

In Example 11, the μ hardness of the golf ball is intensified by the composition of the core, so that the ratio Sp of the hardness of the paint layer with respect to the product μ hardness is intensified. In this case, neither appropriate friction nor contact area can be secured. As a consequence, when the ball is hit, the ball sometimes slips on a club, thereby producing a tendency that the friction force cannot be used effectively for approach. In Example 12 in which the thickness of the cover was intensified, the cover layer was thick, thereby the deformation amount of the cover being short. As a consequence, the contact area between the club and the ball was decreased. Consequently, a sufficient friction force could not be obtained, thereby producing a tendency that no sufficient spin for approach could be obtained. In Example 13 in which the difference Td in tan δ between the paint layer and the cover was set to be small, energy loss could occur, thereby producing a tendency that the spin rate when the ball is hit with a driver was increased.

However, in Example 9 provided with the top coat, no large influence was given to the spin performance, when the thickness of the top coat was too large in Example 14, the friction force was reduced so that the spin rate for the approach was greatly decreased.

What is claimed is:

1. A golf ball comprising:
a core located in a center of the golf ball;
a cover surrounding an outside of the core and having plural dimples on a surface thereof, the cover having a thickness of at most 2 mm;
a paint layer surrounding an outside of the cover, the paint layer formed of a material having rubber elasticity and having a first loss tangent (tan δ) of at least 0.25, the paint layer having a thickness of at most 100 μm; and
a top coat further surrounding an outside of the paint layer, the top coat having a thickness of at most 60 μm,
wherein a material for forming the cover has a second loss tangent, a difference Td between the first loss tangent and the second loss tangent being at least 0.10.

2. The golf ball according to claim 1, wherein the paint layer has a hardness of at most approximately 70 in terms of JIS-C hardness.

3. The golf ball according to claim 1, wherein a material used for forming the paint layer has a Young's Modulus of at most approximately 70 MPa.

4. The golf ball according to claim 1, wherein the material for forming the paint layer has a Poisson's ratio of at least approximately 0.45.

5. The golf ball according to claim 1, wherein the cover contains ionomer resin.

6. The golf ball according to claim 1, wherein the cover has a hardness of at least 40 in terms of Shore D hardness.

7. The golf ball according to claim 1, wherein the paint layer has a lower hardness than the core.

* * * * *